(12) United States Patent
Li et al.

(10) Patent No.: US 10,962,823 B2
(45) Date of Patent: Mar. 30, 2021

(54) DISPLAY MODULE AND DISPLAY DEVICE

(71) Applicant: BOE Technology Group Co., Ltd., Beijing (CN)

(72) Inventors: Zhongxiao Li, Beijing (CN); Xue Dong, Beijing (CN); Xiaochuan Chen, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 154 days.

(21) Appl. No.: 16/006,400

(22) Filed: Jun. 12, 2018

(65) Prior Publication Data
US 2019/0094606 A1 Mar. 28, 2019

(30) Foreign Application Priority Data

Sep. 25, 2017 (CN) .......................... 201710876686.4

(51) Int. Cl.
*G02F 1/29* (2006.01)
*G02F 1/1335* (2006.01)
(Continued)

(52) U.S. Cl.
CPC ..... *G02F 1/133514* (2013.01); *G02B 6/0035* (2013.01); *G02B 6/0053* (2013.01);
(Continued)

(58) Field of Classification Search
CPC ......... G02F 1/133512; G02F 1/136209; G02F 1/133606; G02F 2001/133607;
(Continued)

(56) References Cited

U.S. PATENT DOCUMENTS 7,071,907 B1 * 7/2006 Duboc, Jr. ............... G09G 3/36
345/87
9,651,825 B2 5/2017 Lee
(Continued)

FOREIGN PATENT DOCUMENTS

| CN | 101620290 A | 1/2010 |
|---|---|---|
| CN | 102236224 A | 11/2011 |

(Continued)

OTHER PUBLICATIONS

First Office Action dated Sep. 4, 2019 in Chinese Patent Application No. 20171087686.4, and English translation thereof.
(Continued)

*Primary Examiner* — Edward J Glick
*Assistant Examiner* — Anthony G Quash
(74) *Attorney, Agent, or Firm* — McDermott Will & Emery LLP

(57) ABSTRACT

A display module and a display device. The display module includes: a display panel including a first substrate, a second substrate, and a liquid crystal layer between the first and second substrate; and a backlight panel on a side of the first or second substrate away from the liquid crystal layer. The display panel further includes a color filter layer on a side of the liquid crystal layer away from the backlight panel. The color filter layer includes at least two portions having different transparency. The backlight panel is configured to emit a plurality of directional light beams to the color filter layer. The display panel is configured to change a propagation direction of each of the directional light beams by means of the liquid crystal layer, to adjust an irradiation position of the directional light beam on the color filter layer.

18 Claims, 3 Drawing Sheets

(51) Int. Cl.
*G02F 1/13357* (2006.01)
*G02F 1/1337* (2006.01)
*F21V 8/00* (2006.01)

(52) U.S. Cl.
CPC ........ *G02F 1/1337* (2013.01); *G02F 1/13362* (2013.01); *G02F 1/133512* (2013.01); *G02F 1/133615* (2013.01); *G02F 1/29* (2013.01); *G02F 1/291* (2021.01); *G02F 2201/30* (2013.01); *G02F 2201/305* (2013.01)

(58) Field of Classification Search
CPC ............ G02F 1/133753; G02B 6/0016; G02B 6/0018; G02B 6/0026; G02B 6/0025; G02B 6/0035
See application file for complete search history.

(56) References Cited

U.S. PATENT DOCUMENTS

| | | |
|---|---|---|
| 9,784,996 B2 | 10/2017 | Xie |
| 10,180,530 B2 | 1/2019 | Shin et al. |
| 2008/0084517 A1* | 4/2008 | Itou .................. G02F 1/133514 349/62 |
| 2012/0200807 A1* | 8/2012 | Wei ...................... G02B 6/0043 349/65 |
| 2016/0085118 A1* | 3/2016 | Lee ................... G02F 1/133512 349/62 |
| 2017/0139242 A1 | 5/2017 | Xie |
| 2017/0168209 A1* | 6/2017 | Shin ....................... G02B 27/22 |
| 2019/0094625 A1* | 3/2019 | Haseba ............. G02F 1/133512 |
| 2020/0142247 A1 | 5/2020 | Zhao et al. |

FOREIGN PATENT DOCUMENTS

| | | | | |
|---|---|---|---|---|
| CN | 104730763 A | 6/2015 | | |
| CN | 104849924 A | 8/2015 | | |
| CN | 105700065 A | 6/2016 | | |
| CN | 106526942 A | * 3/2017 | ....... G02F 1/133512 |
| CN | 106526942 A | 3/2017 | | |
| CN | 106707608 A | * 5/2017 | ....... G02F 1/133512 |
| CN | 106896513 A | 6/2017 | | |
| JP | 2008-216357 A | 9/2008 | | |
| KR | 10-2011-0017779 A | 2/2011 | | |

OTHER PUBLICATIONS

Office Action issued in corresponding Chinese Patent Application No. 201710876686.4, dated May 9, 2020.

* cited by examiner

DISPLAY MODULE AND DISPLAY DEVICE

CROSS-REFERENCE TO RELATED APPLICATION

This application claims the priority benefit of Chinese Patent Application No. 201710876686.4 filed on Sep. 25, 2017 in the State Intellectual Property Office of China, the disclosure of which is incorporated herein by reference in entirety.

TECHNICAL FIELD

Embodiments of the present disclosure relate to the field of display technology, and in particular, to a display module and a display device.

BACKGROUND

With the rapid development of liquid crystal display technology, a variety of liquid crystal display devices have emerged. In order to meet people's requirements for liquid crystal display quality, the technology regarding the liquid crystal display device is continuously improving.

The liquid crystal display device generally includes an upper polarizer, a color filter, a liquid crystal layer, a TFT substrate, a lower polarizer, and a backlight source, which are successively arranged in stack. The display device is configured to adjust a polarization direction of light rays by deflection of liquid crystals, then the light rays are blocked by different degrees when passing through the polarizer, so that a preset color in a sub-pixel is displayed with different brightness, thereby realizing an image display.

SUMMARY

In an aspect, an embodiment of the present disclosure provides a display module, comprising: a display panel comprising a first substrate, a second substrate, and a liquid crystal layer between the first substrate and the second substrate; and a backlight panel on a side of the first substrate or the second substrate away from the liquid crystal layer, wherein the display panel further comprises a color filter layer on a side of the liquid crystal layer away from the backlight panel, and the color filter layer comprises at least two portions having different transparency from each other, and wherein the backlight panel is configured to emit a plurality of directional light beams to the color filter layer, and the display panel is configured to change a propagation direction of each of the directional light beams by means of the liquid crystal layer, to adjust an irradiation position of the directional light beam on the color filter layer.

According to an embodiment of the present disclosure, the color filter layer comprises a plurality of first light shielding regions and color filter regions disposed alternately.

According to an embodiment of the present disclosure, the color filter layer comprises a plurality of sub-pixel regions, and each of the sub-pixel regions comprises the plurality of first light shielding regions and color filter regions disposed alternately.

According to an embodiment of the present disclosure, the backlight panel comprises an edge-lit type light source, a light guide plate and a waveguide grating, and the edge-lit type light source is disposed at one end of the light guide plate, and the waveguide grating is disposed on a side of the light guide plate close to the liquid crystal layer.

According to an embodiment of the present disclosure, adjacent first light shielding region and color filter region are configured as a first display unit, and the color filter layer comprises a plurality of the first display units, and wherein the waveguide grating comprises a plurality of grating units in one-to-one correspondence with the plurality of the first display units.

According to an embodiment of the present disclosure, a light shielding layer is provided at a side of the waveguide grating close to the liquid crystal layer, and the light shielding layer comprises a plurality of second light shielding regions and light transmitting regions disposed alternately.

According to an embodiment of the present disclosure, adjacent first light shielding region and color filter region are configured as a second display unit, and the color filter layer comprises a plurality of the second display units, and wherein a light shielding layer is provided at a side of the waveguide grating close to the liquid crystal layer, and the light shielding layer comprises a plurality of second light shielding regions and light transmitting regions disposed alternately, and the plurality of light transmitting regions are in one-to-one correspondence with the plurality of the second display units According to an embodiment of the present disclosure, the first substrate is a color filter substrate, the second substrate is an array substrate, and the backlight panel is disposed on a side of the array substrate away from the liquid crystal layer.

According to an embodiment of the present disclosure, the plurality of sub-pixel regions comprise a red sub-pixel region, a green sub-pixel region, and a blue sub-pixel region.

According to an embodiment of the present disclosure, the plurality of color filter regions comprise a red filter region, a green filter region, and a blue filter region, and the color filter region of each sub-pixel region has a same filter color.

According to an embodiment of the present disclosure, a first alignment layer is provided on a side of the liquid crystal layer close to the color filter layer, a second alignment layer is provided on a side of the liquid crystal layer close to the backlight panel, and the first alignment layer and the second alignment layer are configured to fix a pretilt angle of liquid crystals in the liquid crystal layer in an initial state.

According to an embodiment of the present disclosure, in the initial state of the liquid crystal layer: a direction of long axis of the liquid crystals in the liquid crystal layer is parallel to a propagation direction of the directional light beams in the liquid crystal layer; or, the direction of long axis of the liquid crystals in the liquid crystal layer is parallel to the display panel.

According to an embodiment of the present disclosure, in response to a first relative positional relationship between each color filter region and a corresponding directional light beam, the directional light beam is irradiated in a corresponding color filter region in a preset initial state; and in response to a second relative positional relationship between each color filter region and the corresponding directional light beam, the directional light beam is irradiated in a corresponding first light shielding region in a preset initial state.

According to an embodiment of the present disclosure, the edge-lit type light source is a blue polarized light source, the color filter regions are made of a quantum dot material, and each grating unit of the waveguide grating has a same specification.

According to an embodiment of the present disclosure, the edge-lit type light source is a white polarized light source, the color filter regions are made of an optical substrate material, a diffusion film is provided on a side of the color filter layer away from the liquid crystal layer for expanding a viewing angle of light, and each grating unit of the waveguide grating has a light extraction wavelength corresponding to a filter color of the corresponding sub-pixel region.

In another aspect, an embodiment of the present disclosure provides a display device, comprising the above-described display module.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION

In order to further illustrate technical means and functions of the embodiments of the present disclosure, specific examples, structures, features and effects of the display module and the display device according to the embodiments of the present disclosure will be described in detail below with reference to the accompanying drawings and embodiments.

During manufacturing liquid crystal display devices, air bubbles are easily generated during a process of affixing a polarizer, thereby affecting display quality. In addition, if the display device is in a condition of high temperature, the polarizer is prone to aging, thereby affecting service life.

The embodiments of the present disclosure provide a display module and a display device, through which the quality and the service life of the display module may be improved, and production cost may be reduced.

Figure 1:
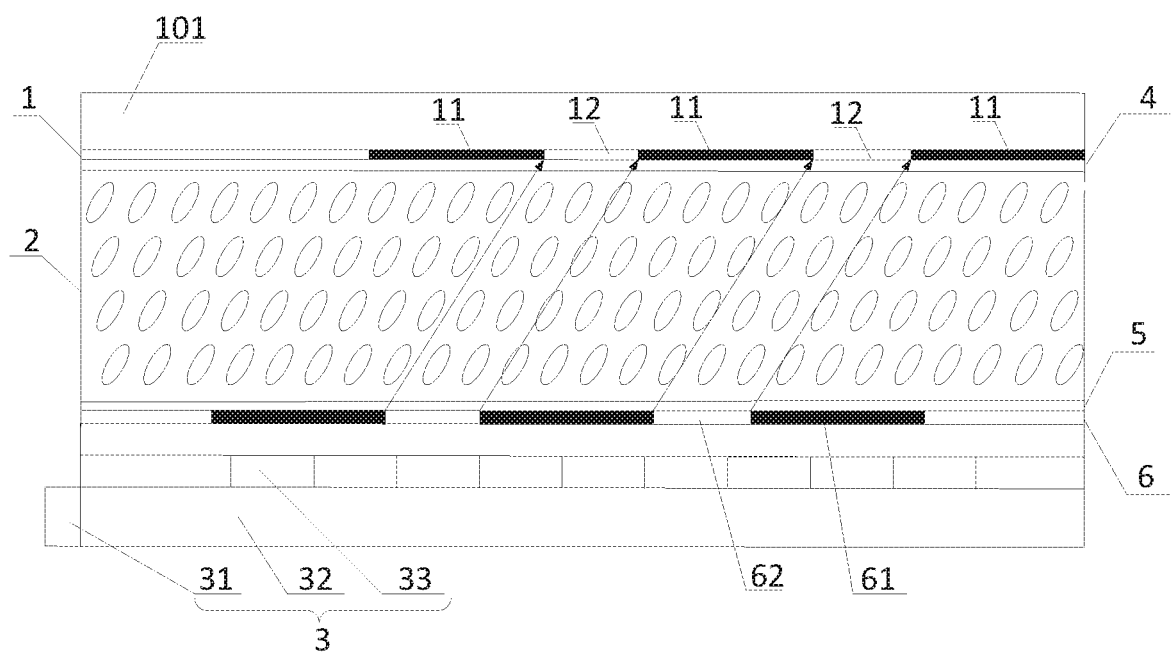
FIG. 1 is a schematic structural view of a display module according to an embodiment of the present disclosure.

As shown in FIG. 1, an embodiment of the present disclosure provides a display module including a display panel and a backlight panel 3.

Figure 2:
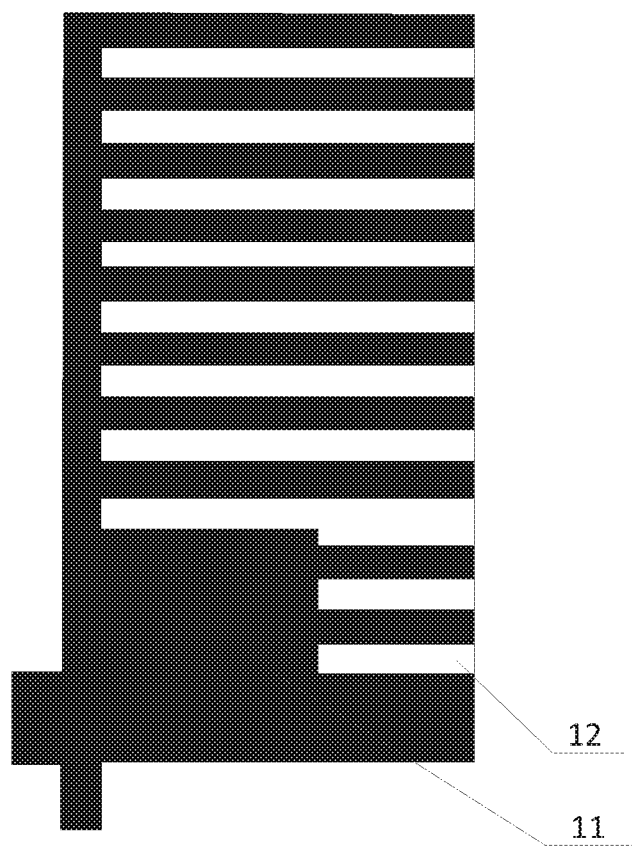
FIG. 2 is a schematic structural view of a sub-pixel region in a display module according to an embodiment of the present disclosure.

The display panel includes a first substrate 101, a second substrate, and a liquid crystal layer 2 disposed between the first substrate 101 and the second substrate. A color filter layer 1 is provided on a side of the liquid crystal layer close to the first substrate. The color filter layer 1 includes a plurality of sub-pixel regions. As shown in FIG. 2, each sub-pixel region includes a plurality of alternately disposed first light shielding regions 11 and color filter regions 12.

The backlight panel 3 is disposed on a side of the second substrate away from the liquid crystal layer. The backlight panel 3 serves to emit a plurality of directional light beams to the color filter layer 1, and the display panel serves to change a propagation direction of each of the directional light beams by means of the liquid crystal layer, to adjust an irradiation position of the directional light beam on the color filter layer 1.

Herein, the first substrate may be a color filter substrate, the second substrate may be an array substrate, the color filter layer 1 is disposed on the side of the liquid crystal layer close to the first substrate, and the color filter layer 1 may have a plurality of sub-pixel regions. The plurality of sub-pixel regions may include a red sub-pixel region, a green sub-pixel region, and a blue sub-pixel region. The above three sub-pixel regions may respectively display red light, green light, and blue light. Since each of the above three sub-pixel regions may have different gray scales, so these three colors can be mixed to form a variety of different colors of colored light. In this embodiment, each sub-pixel region includes a plurality of first light shielding regions 11 and color filter regions 12 disposed alternately. Similarly, the color filter regions 12 may also include a red filter region, a green filter region, and a blue filter region, and the color filter region 12 of each sub-pixel region has a same filter color corresponding to the display color of the sub-pixel region. When light is emitted to any one color filter region 12, for example, a red filter region, only red light can pass through the red filter region, and light with other colors will be absorbed by the red filter region, thus the red filter region can display red. When the light is emitted to the first light shielding region 11, the first light shielding region 11 can absorb all colors of light completely so that the light cannot pass through the first light shielding region 11.

The liquid crystal layer is filled with liquid crystals, and the liquid crystals refer to the fact that, after the materials are in a molten state or are dissolved by a solvent, the mobility of liquid substances is obtained although the rigidity of solid substances is lost, and the anisotropy and the ordered arrangement of molecules of partial crystalline substances are retained, thereby forming an intermediate fluid with both crystalline properties and liquid properties. Under the action of an electric field or a magnetic field, it is possible to control the rotation of the liquid crystals to change the propagation direction of the light passing through the liquid crystal layer.

The backlight panel 3 serves to emit a plurality of directional light beams to the color filter layer 1. The directional light beam refers to a collection of a plurality of light rays emitted by the backlight panel 3, and each of the plurality of light rays is emitted in the same preset direction. The directional light beam can be emitted to the color filter layer 1 through the liquid crystal layer. The adjacent first light shielding region 11 and the color filter region 12 on the color filter layer 1 can serve as a display unit, optionally, each directional light beam corresponds to a display unit, and there is a gap between two adjacent directional light beams. There are three kinds of irradiation cases for the directional light beam and the color filter layer 1. In the first case, the directional light beam is fully irradiated in the first light shielding region 11, thus the display unit cannot work because the light cannot be transmitted through the first light shielding region 11. In the second case, the directional light beam is fully irradiated in the color filter region 12, thus the display unit can display a preset color because the light of a preset color can be transmitted through the color filter region 12. In the third case, a part of the directional light beam is irradiated in the first light shielding region 11, and the other part is irradiated in the color filter region 12, thus the display unit can also display the preset color, but the display brightness is lower than that in the second case.

The propagation direction of the directional light beam in the liquid crystal layer can be adjusted by changing a pre-tilt angle of the liquid crystals in the liquid crystal layer, and an irradiation position of the directional light beam on the color filter layer 1 can be changed through the liquid crystal layer. When the display unit does not need to display the preset color, the liquid crystal layer can regulate the directional light beam to be fully irradiated in the first light shielding region 11. When the display unit needs to display a preset color with a certain brightness, the liquid crystal layer can regulate some or all of the directional light beam to be irradiated in the color filter region 12 according to the requirements for brightness for displaying the preset color. According to the above-mentioned working principle, the display color and the display brightness of each display unit in the color filter layer 1 can be adjusted through the adjustment of the liquid crystal layer.

The embodiment of the present disclosure provides a display module for improving the quality and service life of the display module and reducing the production cost. In the related art, the display module is configured to adjust a polarization direction of light by deflection of liquid crystals, then the light is blocked to different extent when passing through the polarizer, so that a preset color in a sub-pixel is displayed with different brightness, thereby realizing an image display. However, air bubbles are easily generated during a process of affixing the polarizer, thereby degrading the display quality. In addition, if the display device is in a condition of high temperature, the polarizer is prone to aging, thereby degrading the service life. Compared with the related art, the display module according to the embodiment of the present disclosure includes a display panel and a backlight panel, the sub-pixel region of the color filter layer in the display panel includes a plurality of first light shielding regions and color filter regions disposed alternately, and the backlight panel serves to emit a plurality of directional light beams to the color filter layer. When the directional light beam is irradiated in the first light shielding region, the color cannot be displayed; when the directional light beam is irradiated in the color filter region, the preset color can be displayed. The liquid crystal layer serves to change the propagation direction of the directional light beam, to adjust the irradiation position of the directional light beam on the color filter layer. In this way, the irradiation ratio of the directional light beam on the first light shielding region and the color filter region can be adjusted, so that the preset color with different brightness can be displayed. This technical solution replaces the polarizer in the related art. It not only can improve the quality of the display module, but also can ensure the service life of the display module. At the same time, since the polarizer is not used, the cost can be saved.

The above-mentioned backlight panel 3 serves to emit the directional light beam to the color filter layer 1, and the backlight panel 3 may have various structural styles. Optionally, the backlight panel 3 includes an edge-lit type light source 31, a light guide plate 32, and a waveguide grating 33. The edge-lit type light source 31 is disposed at one end of the light guide plate 32, and the waveguide grating is disposed on a side of the light guide plate close to the liquid crystal layer. In this embodiment, the edge-lit type light source 31 may be disposed on the periphery of the display module, and the light emitted from the edge-lit type light source 31 is guided to a central area of the display module through the light guide plate 32 to realize pattern display of the display module. The edge-lit type light source 31 not only can save costs, but also can control the thickness of the display module to meet the requirements of consumers. The light guide plate 32 can transmit the light emitted from the edge-lit type light source 31 to the waveguide grating 33, and the waveguide grating 33 can convert the light in the light guide plate 32 into the directional light beams to be emitted to the color filter layer 1.

Figure 3:
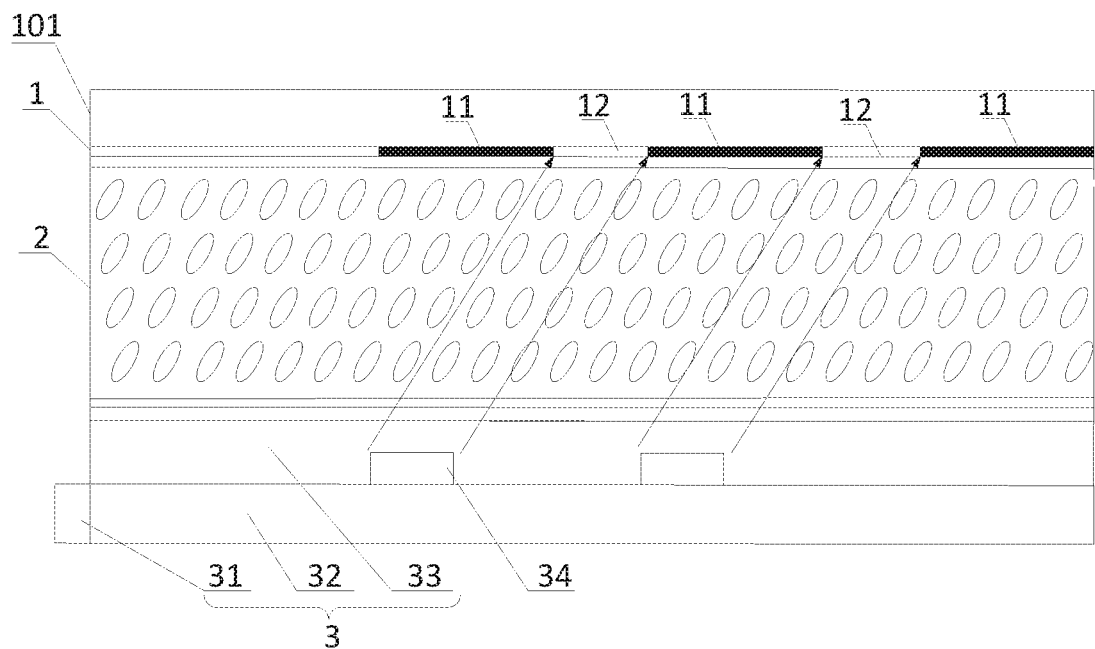
FIG. 3 is a schematic structural view of a display module according to another embodiment of the present disclosure.

The above-mentioned waveguide grating has a variety of styles. Optionally, as shown in FIG. 3, the adjacent first light shielding region 11 and color filter region 12 serve as a first display unit, and the waveguide grating 33 includes a plurality of grating units 34 in one-to-one correspondence with the plurality of first display units. In this embodiment, the waveguide grating 33 serves to emit a plurality of spaced apart directional light beams. Specifically, each waveguide grating 33 has a plurality of grating units 34, and each of the grating units 34 may include one or more gratings. The directional light beam emitted by each grating unit 34 is irradiated on the corresponding first display unit, the plurality of grating units 34 emit the plurality of directional light beams correspondingly. There is a gap between two directional light beams emitted by the two adjacent grating units 34, so as to prevent the directional light beams from interacting with each other.

Optionally, as shown in FIG. 1, the adjacent first light shielding region 11 and color filter region 12 serve as a second display unit. A light shielding layer 6 is provided at a side of the waveguide grating close to the liquid crystal layer, and the light shielding layer 6 includes a plurality of second light shielding regions 61 and light transmitting regions 62 disposed alternately. The directional light beam emitted by the backlight panel can pass through the light transmitting region 62 and the liquid crystal layer to be irradiated on the color filter layer 1. The plurality of light transmitting regions 62 are in one-to-one correspondence with the plurality of the second display units. In this embodiment, the waveguide grating serves to emit planar light, and the planar light emitted by the waveguide grating can be divided into a plurality of spaced apart directional light beams by the light shielding layer 6. Specifically, the light shielding layer 6 includes a plurality of second light shielding regions 61 and light transmitting regions 62 disposed alternately, a portion of the light emitted by the waveguide grating is irradiated on the light transmitting region 62, and the other portion is irradiated on the second light shielding region 61. The light irradiated on the second light shielding region 61 is absorbed by the second light shielding region 61, so cannot be irradiated on the color filter layer 1 through the second light shielding region 61. The light irradiated on the light transmitting region 62 is integrated into a directional light beam and passes through the light transmitting region 62 to be irradiated on the color filter layer 1. The provision of the light shielding layer 6 can save design cost and processing cost, and improve practicality. Further, the transparent area on the light shielding layer 6 can be made of a transparent resin material.

The propagation direction of the directional light beam can be changed by the liquid crystal layer 2. Specifically, a first electrode layer is provided between the liquid crystal layer 2 and the color filter layer 1, a second electrode layer is provided between the liquid crystal layer 2 and the backlight panel 3, and the first electrode layer and the second electrode layer serve to apply an electric field to the liquid crystal layer 2, to adjust deflection angle of the liquid crystals in the liquid crystal layer 2. In this embodiment, the electric field may be applied to the liquid crystal layer 2 through the first electrode layer and the second electrode layer. The liquid crystals in the liquid crystal layer 2 have different deflection angles in response to electric fields with different magnitudes, and the different deflection angles of the liquid crystals corresponds to different refractive indexes. The change of refractive index of the liquid crystals can change the propagation direction of the directional light beam. Therefore, when the propagation direction of the directional light beam needs to be adjusted, it is only necessary to adjust a voltage between the first electrode layer and the second electrode layer, so the adjustment may be made very quickly and easily.

Optionally, a first alignment layer 4 is provided on a side of the liquid crystal layer close to the first substrate 101, a second alignment layer 5 is provided on a side of the liquid crystal layer close to the second substrate, and the first alignment layer 4 and the second alignment layer 5 serve to fix a pretilt angle the liquid crystals in the liquid crystal layer 2 in an initial state. In this embodiment, the first alignment layer 4 and the second alignment layer 5 are respectively disposed on two sides of the liquid crystal layer 2, and the first alignment layer and the second alignment layer serve to provide an initial pretilt angle for the liquid crystals in the liquid crystal layer 2, so that the liquid crystals may be oriented and arranged on the surface in a specific direction.

The pretilt angle of the liquid crystals in the above-mentioned liquid crystal layer 2 may be various. In the initial state of the liquid crystal layer 2, a direction of long axis of the liquid crystals in the liquid crystal layer 2 is parallel to a propagation direction of the directional light beams in the liquid crystal layer 2; or, the direction of long axis of the liquid crystals in the liquid crystal layer 2 is parallel to the display panel. In this embodiment, the initial state of the liquid crystal layer 2 refers to a state in which the voltage between the electrodes on both sides of the liquid crystal layer 2 is zero. In this state, arrangement angle of the liquid crystals is the pretilt angle of the liquid crystals. The pretilt angle of the liquid crystals is mainly set by the first alignment layer and the second alignment layer. When the voltage between the electrodes on both sides of the liquid crystal layer 2 changes, the liquid crystals in the liquid crystal layer 2 are driven to be deflected, to change the refractive index of the liquid crystal layer 2, thereby adjusting the propagation direction of the directional light beams passing through the liquid crystal layer 2.

Further, in response to a first relative positional relationship between each color filter region and a corresponding directional light beam, the directional light beam is irradiated in a corresponding color filter region in a preset initial state; and in response to a second relative positional relationship between each color filter region and a corresponding directional light beam, the directional light beam is irradiated in a corresponding first light shielding region 11 in a preset initial state. In this embodiment, the above-mentioned preset initial state may be any of a variety of initial states, which are not limited herein. Since each color filter region 12 and its corresponding directional light beam have a plurality of relative positional relationships, the display unit has different display modes in the initial state. Specifically, when the directional light beam is irradiated in the corresponding color filter region, the display unit is of a normally white display mode, and when the directional light beam is irradiated in the corresponding first light shielding region 11, the display unit is of a normally black display mode. Therefore, different initial display states can be achieved by adjusting the relative positional relationship between the directional light beam and the color filter region 12. In addition, the first relative positional relationship and the second relative positional relationship affect the initial state of the liquid crystals and the arrangement of the propagation direction of the directional light beam.

Depending on the different relative positional relationships between the color filter region 12 and the directional light beam, there may be multiple display states, for example:

First state: as shown in FIG. 1, each color filter region 12 and its corresponding directional light beam have the first relative position relationship, when the direction of long axis of the liquid crystals in the liquid crystal layer 2 is parallel to the propagation direction of the directional light beam in the liquid crystal layer 2, the directional light beam is irradiated in the corresponding color filter region 12.

Figure 4:
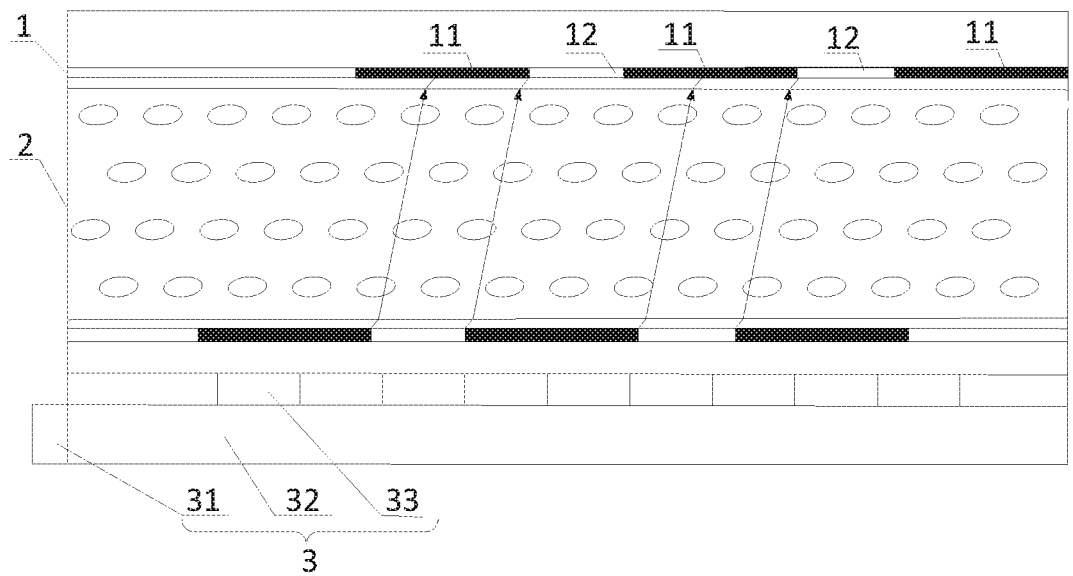
FIG. 4 is a schematic structural view of a display module according to further another embodiment of the present disclosure.

Second state: as shown in FIG. 4, each color filter region 12 and its corresponding directional light beam have the first relative position relationship, when the direction of long axis of the liquid crystals is parallel to the display panel, the directional light beam is irradiated in the corresponding first light shielding region 11.

Figure 5:
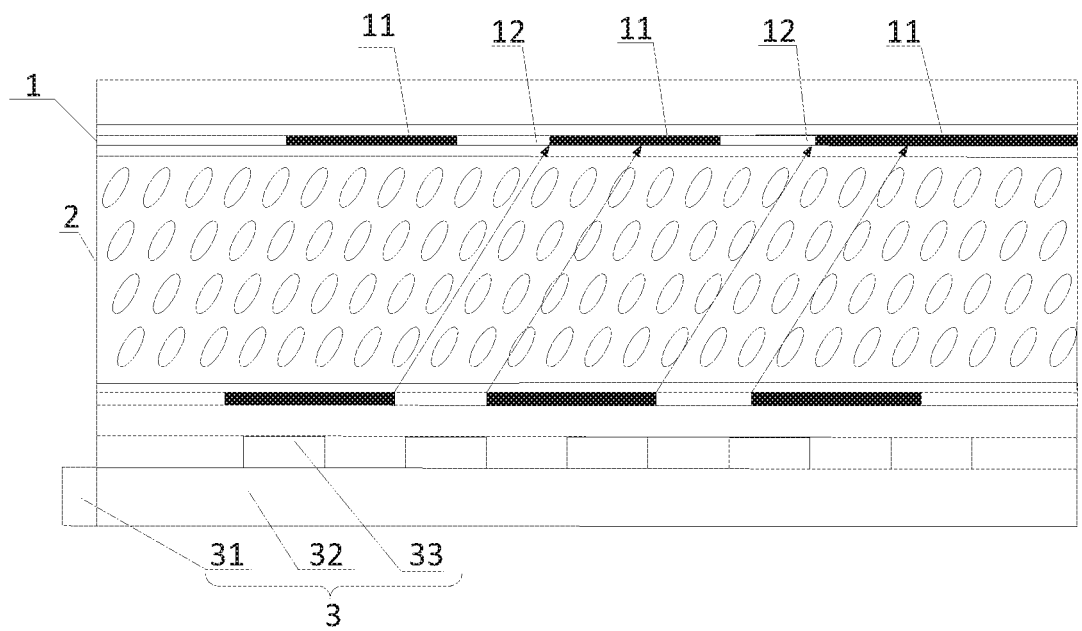
FIG. 5 is a schematic structural view of a display module according to still another embodiment of the present disclosure.

Third state: as shown in FIG. 5, each color filter region 12 and its corresponding directional light beam have the second relative position relationship, when the direction of long axis of the liquid crystals in the liquid crystal layer 2 is parallel to the propagation direction of the directional light beam in the liquid crystal layer 2, the directional light beam is irradiated in the corresponding first light shielding region 11.

Figure 6:
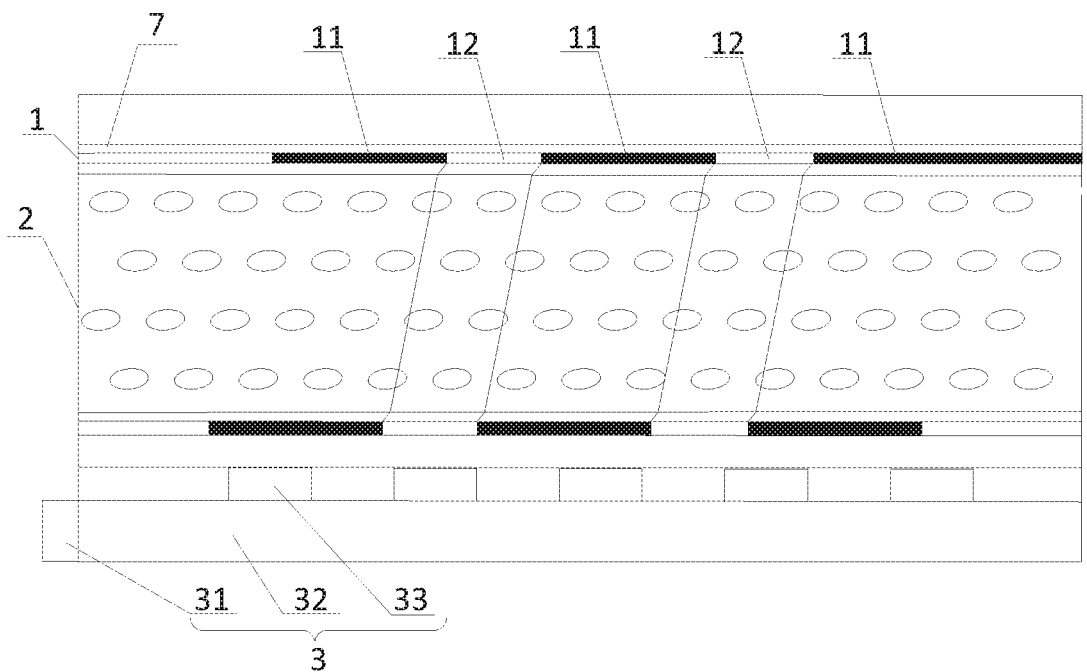
FIG. 6 is a schematic structural view of a display module according to yet still another embodiment of the present disclosure.

Fourth state: As shown in FIG. 6, each color filter region 12 and its corresponding directional light beam have the second relative position relationship, when the direction of long axis of the liquid crystals is parallel to the display panel, the directional light beam is irradiated in the corresponding color filter region 12.

As shown in FIG. 1 and FIG. 2, the above-mentioned edge-lit type light source 31 and the color filter region 12 may have various styles. Optionally, the edge-lit type light source 31 is a blue polarized light source, the color filter region 12 is made of a quantum dot material, and each grating unit 34 of the waveguide grating 33 has a same specification. In this embodiment, the color filter region 12 is made of a quantum dot material, when the directional light beam passes through the color filter region, the quantum dot material can not only emit light of a preset color, but also widen the angle of the light, thereby facilitating viewers to observe the display pattern of the display module in various angles. In addition, since the edge-lit type light source 31 is a blue polarized light source, it is enough for the grating elements 34 of the waveguide grating 33 to have the same specification, thereby saving the design cost. Herein, the quantum dot film, the blue polarized light source, and the waveguide grating 33 in this embodiment cooperate with each other.

The above-mentioned edge-lit type light source 31 and the color filter region 12 may have various styles. As shown in FIG. 6, optionally, a diffusion film 7 is provided on a side of the color filter layer 1 away from the liquid crystal layer 2 for expanding a viewing angle of light. The edge-lit type light source 31 is a white polarized light source, the color filter region 12 is made of an optical substrate material, and each grating unit of the waveguide grating has a light extraction wavelength corresponding to a filter color of the corresponding sub-pixel region. In this embodiment, since the color filter region does not have an effect of expanding the light, a diffusion film is provided on the side of the color filter layer 1 away from the liquid crystal layer 2. The viewing angle of the light is expanded by the diffusion film to facilitate the viewer to observe. Since the edge-lit type light source 31 is a white polarized light source and the lights with different colors have different wavelengths, each grating unit of the waveguide grating is configured to have a light extraction wavelength corresponding to the filter color of the corresponding sub-pixel region, so that the grating unit emits the light having the corresponding wavelength. In addition, the color filter region adopts the optical substrate material, that is, color group material, for example, composed of acrylic acid, polycarbonate and glass.

In another aspect, an embodiment of the present disclosure further provides a display device, including the above display module.

The embodiment of the present disclosure provides a display device for improving the quality and service life of the display module and reducing the production cost. In the related art, the display device is configured to adjust a polarization direction of light by deflection of liquid crystals, then the light is blocked to different extent when passing through the polarizer, so that a preset color in a sub-pixel is displayed with different brightness, thereby realizing an image display. However, air bubbles are easily generated during a process of affixing the polarizer, thereby affecting the display quality. In addition, if the display device is in a condition of high temperature, the polarizer is prone to aging, thereby affecting the service life. Compared with the related art, the display device according to the embodiment of the present disclosure includes a display module, the display module includes a color filter layer, a liquid crystal layer, and a backlight panel, which are successively arranged in stack. The color filter layer includes a plurality of spaced apart first light shielding regions and color filter regions, and the backlight panel includes a plurality of light emitting units. Each of the light emitting units serves to emit a directional light beam to the color filter layer. When the directional light beam is irradiated in the first light shielding region, the color cannot be displayed; when the directional light beam is irradiated in the color filter region, the preset color can be displayed. The liquid crystal layer serves to change the propagation direction of the directional light beam, to adjust the irradiation position of the directional light beam on the color filter layer. In this way, the irradiation ratio of the directional light beam on the first light shielding region and the color filter region can be adjusted, so that the preset color with different brightness can be displayed. This technical solution replaces the polarizer in the related art. It not only can improve the quality of the display module, but also can ensure the service life of the display module. At the same time, since the polarizer is not used, the cost can be saved.

In summary, some specific embodiments of the present disclosure have been described above, but the scope of the present disclosure is not limited thereto. Changes or replacements may be made to the present disclosure by those skilled in the art within the technical scope disclosed by the present disclosure, and all the changes or replacements fall within the scope of the present disclosure. Therefore, the scope of the present disclosure is defined by the appended claims.

What is claimed is:

1. A display module, comprising:
   a display panel comprising a first substrate, a second substrate, and a liquid crystal layer between the first substrate and the second substrate; and
   a backlight panel on a side of the first substrate or the second substrate away from the liquid crystal layer,
   wherein the display panel further comprises a color filter layer on a side of the liquid crystal layer away from the backlight panel, and the color filter layer comprises at least two portions having different transparency from each other,
   wherein the backlight panel is configured to emit a plurality of directional light beams to the color filter layer, and the display panel is configured to change a propagation direction of each of the directional light beams by means of the liquid crystal layer, to adjust an irradiation position of the directional light beam on the color filter layer,
   wherein the color filter layer comprises a plurality of first light shielding regions and color filter regions disposed alternately, and
   wherein the display module does not use any polarizer,
   wherein there are two positional relationships between the color filter region and the directional light beam, and wherein the display module has the following display states:
   in a first state, each color filter region and its corresponding directional light beam have a first relative position relationship, when a direction of long axis of the liquid crystals in the liquid crystal layer is parallel to a propagation direction of the directional light beam in the liquid crystal layer, the directional light beam is irradiated in a corresponding color filter region,
   in a second state, each color filter region and its corresponding directional light beam have the first relative position relationship, when the direction of long axis of the liquid crystals is parallel to the display panel, the directional light beam is irradiated in a corresponding first light shielding region,
   in a third state, each color filter region and its corresponding directional light beam have a second relative position relationship, when the direction of long axis of the liquid crystals in the liquid crystal layer is parallel to the propagation direction of the directional light beam in the liquid crystal layer, the directional light beam is irradiated in the corresponding first light shielding region, and
   in a fourth state, each color filter region and its corresponding directional light beam have the second relative position relationship, when the direction of long axis of the liquid crystals is parallel to the display panel, the directional light beam is irradiated in the corresponding color filter region.

2. The display module according to claim 1, wherein the color filter layer comprises a plurality of sub-pixel regions, and each of the sub-pixel regions comprises the plurality of first light shielding regions and color filter regions disposed alternately.

3. The display module according to claim 2, wherein the plurality of sub-pixel regions comprise a red sub-pixel region, a green sub-pixel region, and a blue sub-pixel region.

4. The display module according to claim 2, wherein the plurality of color filter regions comprise a red filter region, a green filter region, and a blue filter region, and the color filter region of each sub-pixel region has a same filter color.

5. A display device, comprising the display module according to claim 2.

6. The display module according to claim 2, wherein the backlight panel comprises an edge-lit type light source, a light guide plate and a waveguide grating, and the edge-lit type light source is disposed at one end of the light guide plate, and the waveguide grating is disposed on a side of the light guide plate adjacent to the liquid crystal layer.

7. The display module according to claim 6, wherein a light shielding layer is provided at a side of the waveguide grating adjacent to the liquid crystal layer, and the light shielding layer comprises a plurality of second light shielding regions and light transmitting regions disposed alternately.

8. The display module according to claim 6, wherein adjacent first light shielding region and color filter region are configured as a second display unit, and the color filter layer comprises a plurality of the second display units, and
  wherein a light shielding layer is provided at a side of the waveguide grating adjacent to the liquid crystal layer, and the light shielding layer comprises a plurality of second light shielding regions and light transmitting regions disposed alternately, and the plurality of light transmitting regions are in one-to-one correspondence with the plurality of the second display units.

9. A display device, comprising the display module according to claim 6.

10. The display module according to claim 6, wherein adjacent first light shielding region and color filter region are configured as a first display unit, and the color filter layer comprises a plurality of the first display units, and
  wherein the waveguide grating comprises a plurality of grating units in one-to-one correspondence with the plurality of the first display units.

11. The display module according to claim 10, wherein the edge-lit type light source is a blue polarized light source, the color filter regions are made of a quantum dot material, and each grating unit of the waveguide grating has a same specification.

12. The display module according to claim 10, wherein the edge-lit type light source is a white polarized light source, the color filter regions are made of an optical substrate material, a diffusion film is provided on a side of the color filter layer away from the liquid crystal layer for expanding a viewing angle of light, and each grating unit of the waveguide grating has a light extraction wavelength corresponding to a filter color of the corresponding sub-pixel region.

13. The display module according to claim 1, wherein the first substrate is a color filter substrate, the second substrate is an array substrate, and the backlight panel is disposed on a side of the array substrate away from the liquid crystal layer.

14. A display device, comprising the display module according to claim 1.

15. The display module according to claim 1, wherein a first alignment layer is provided on a side of the liquid crystal layer adjacent to the color filter layer, a second alignment layer is provided on a side of the liquid crystal layer adjacent to the backlight panel, and the first alignment layer and the second alignment layer are configured to fix a pretilt angle of liquid crystals in the liquid crystal layer in an initial state.

16. A display device, comprising the display module according to claim 15.

17. The display module according to claim 15, wherein, in the initial state of the liquid crystal layer:
  the direction of long axis of the liquid crystals in the liquid crystal layer is parallel to the propagation direction of the directional light beams in the liquid crystal layer; or,
  the direction of long axis of the liquid crystals in the liquid crystal layer is parallel to the display panel.

18. The display module according to claim 17, wherein,
  in response to the first relative positional relationship between each color filter region and a corresponding directional light beam, the directional light beam is irradiated in the corresponding color filter region in a preset initial state; and
  in response to the second relative positional relationship between each color filter region and the corresponding directional light beam, the directional light beam is irradiated in the corresponding first light shielding region in a preset initial state.

* * * * *